Figure 1:
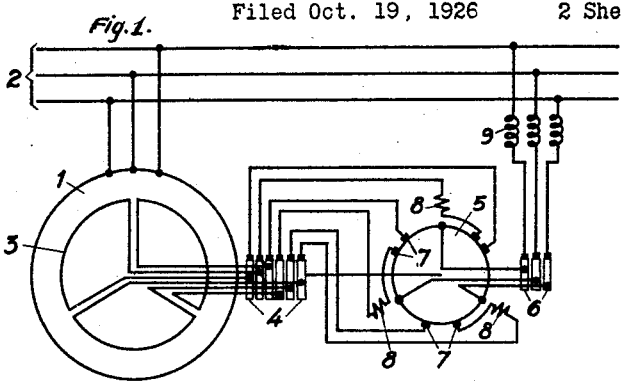

May 7, 1929.   L. DREYFUS   1,712,033
COMMUTATING MACHINE CONNECTED TO INDUCTION MACHINES
Filed Oct. 19, 1926   2 Sheets-Sheet 1

LUDWIG DREYFUS
INVENTOR
BY
ATTORNEY.

May 7, 1929.  L. DREYFUS  1,712,033
COMMUTATING MACHINE CONNECTED TO INDUCTION MACHINES
Filed Oct. 19, 1926  2 Sheets-Sheet 2

Inventor:
Ludwig Dreyfus.
per
Attorney.

Patented May 7, 1929.

1,712,033

UNITED STATES PATENT OFFICE.

LUDWIG DREYFUS, OF VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN.

COMMUTATING MACHINE CONNECTED TO INDUCTION MACHINES.

Application filed October 19, 1926, Serial No. 142,640, and in Sweden October 26, 1925.

If in an induction machine having a commutating machine connected to its secondary terminals, the voltage on the latter machine is kept constant (independent of the load), the result as regards the induction machine will be either a change in the no-load speed (above or below synchronism) or variation in the reactive component of the no-load current (phase compensation), or both, depending on the phase of the impressed voltage. In many cases it may however be desirable that the voltage on the commutating machine should rise or sink with the load. The action hereof will be either a pure compounding or a phase compensation variable with the load, depending on the phase of the voltage component which is variable with the load. The result of the first alternative will be substantially a slip regulation without losses, that of the second a more uniform power factor at different loads.

If the commutating machine connected to the secondary terminals consists of a mere frequency converter primarily connected directly to the mains, it cannot be caused to deliver a voltage component variable with the load simply by introducing an exciting winding traversed by the load current. This is due to the fact, that the voltage of the commutating machine in such case is determined only by the impressed voltage and by the brush position, and the only result of the introduction of an additional exciting current would be, that the exciting current component taken from the line is varied to a corresponding degree. In such cases, on the contrary, where a frequency converter connected to the line only serves as an exciter for a separate commutating machine, the armature of which is connected to the secondary terminals of the induction machine, it has been proposed to arrange a compound winding on this separate commutating machine. The present invention has for its object to provide another arrangement which affords the advantages that it can be used also for a commutator machine connected directly to the line, and that in using a separate commutator machine excited by a frequency converter, a smaller quantity of copper and exciting power will be required than with the known arrangement referred to.

The invention is generally carried out in such manner that a winding traversed by the load current (for instance, the secondary current of the induction machine) is placed on the commutator machine (frequency converter) connected to the line, and that at the same time there is interposed between the primary winding of the latter machine and the line an impedance which makes the voltage on said latter machine to a certain amount independent of the line voltage.

Some forms of the invention are diagrammatically illustrated in Figs. 1–4 of the accompanying drawing.

Referring to Fig. 1, the primary winding 1 of the induction machine is connected to the line 2, while the secondary winding 3 consists of three separate phase windings connected to six sliprings 4, corresponding to the beginning and end of each phase. Mechanically coupled to the induction machine, for instance by a common shaft, is a commutator machine 5, the rotor of which has a winding connected to the line by means of sliprings 6. The same or another rotor winding is provided with a commutator having two, preferably adjustable brush sets 7 for each phase bearing thereon. These brush sets are connected to the sliprings 4, however through the intermediary of a series winding 8 on the stator of the machine 6. Between the sliprings 6 and the line is according to the invention arranged an impedance 9 which in the present combination is preferably of inductive character.

The arrangement described operates in the following manner: After the brushes 7 have been set to a certain position defined by the desired no-load speed and the desired compensation of the no-load current of the main machine 1, the winding 8 will act exciting on the commutator machine. The latter will then absorb less reactive current from the line, and the voltage drop in the impedance 9 will be reduced. The machine will thus obtain a higher impressed voltage, and the compensation of the main machine will vary according to the load. By choosing the number of turns and angular position of the series winding 8 and the value of the inductive and ohmic components of the impedance 9, the influence of the load upon the active component can be increased or reduced, according as it is desired to regulate the slip or only the no-load speed.

Figure 2:
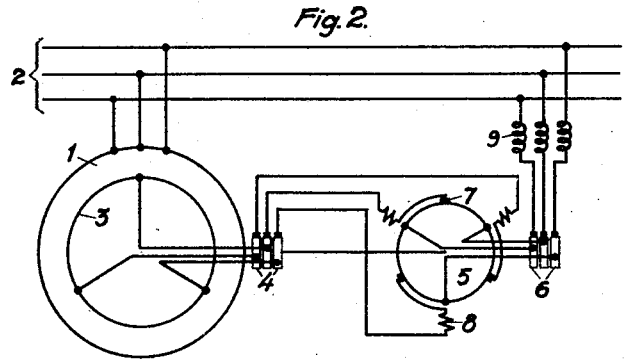

In Fig. 2, there is shown a form of the invention which is more simple and therefore does not afford so large possibilities of regulation, but which in some cases may be sufficient. The secondary winding 3 of the main machine 1 is here a usual three-phase winding having three terminals connected to sliprings 4, and in analogy therewith, the commutator machine 5 has only three brush sets 7. In other respects, the arrangement is the same as in Fig. 1, utilizing a series winding 8 on the commutator machine and a three-phase impedance 9 between the sliprings 6 of the latter and the line 2.

The arrangement according to Fig. 2 is particularly intended for such cases where only one no-load speed is required, but both a phase compensation independent of the load and a slip regulation without losses are desired.

Figure 3:
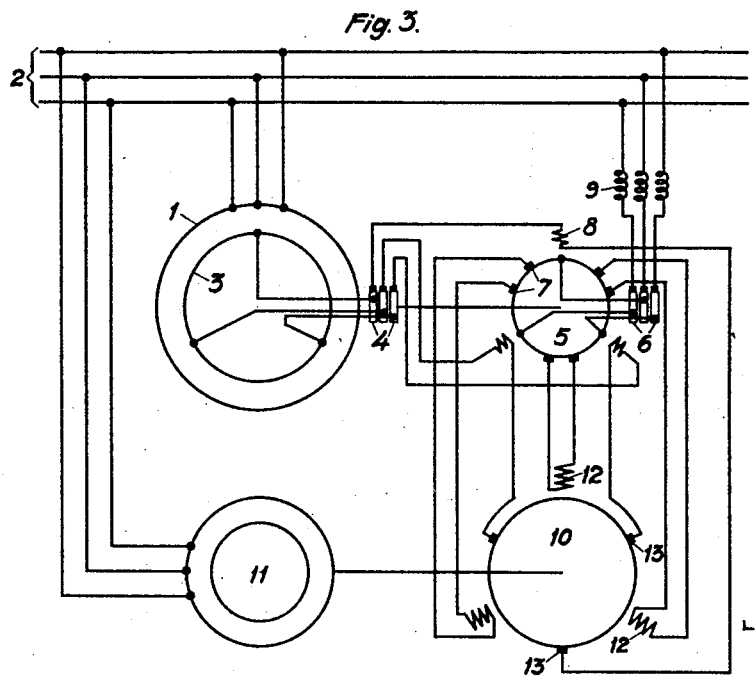

Both of the forms now described constitute different examples of the most simple type of the invention, in which the frequency converter primarily connected to the line is on its secondary side directly connected to the secondary terminals of the main machine. This type has however its limitation, partly because the frequency converter cannot be made above a certain size, partly because the regulation of the active and of the reactive power will be rather closely dependent on one another. In many cases therefore, the type of machine combination is preferred, of which Fig. 3 shows an example, and the characteristic feature of which is that the frequency converter connected to the line only serves as an exciter for a larger commutating machine connected to the secondary terminals of the main machine.

The primary winding of the main machine is still designated by 1 and its secondary by 3. As in Fig. 2, the latter is three phase wound and connected to three sliprings 4. The frequency converter 5 which is connected to the line 2 by a three-phase impedance 9 is here as in Fig. 1 provided with double brush sets, but this arrangement is only shown as an example. Several frequency converters of the types shown may cooperate to excite the larger commutating machine now to be described.

The latter, designated by 10, is preferably mechanically connected to a separate machine 11 which is electrically connected to the line. Which one of these machines runs as a generator or as a motor depends on whether the main machine runs as a generator or as a motor, above or below synchronism. The machine 10 is for instance provided with salient poles, main as well as commutating poles, whence it can be built for a comparatively large power. The main poles 12 are excited from the machine 5, while the current from the brushes 13 flows through the series winding 8 of said latter machine to the sliprings 4 of the main machine.

The manner of operation will be substantially the same as in Fig. 1, although with the difference that the secondary load current of the induction machine does not pass through the impedance 9, and that the voltage regulation of the converter 5 can thus be made more independent of the load.

Instead of causing the load current to flow directly through the stator winding of the frequency converter, its action may of course be transmitted thereupon by a series transformer the secondary of which is inserted in the leads to the converter. The primary of the series transformer may also be inserted between the line and the primary of the induction machine. In this case, no particular winding is necessary on the converter for the purpose of the invention. The transformer should be of the type absorbing a high exciting current, and a particular impedance between the line and the frequency converter can then be dispensed with.

Figure 4:
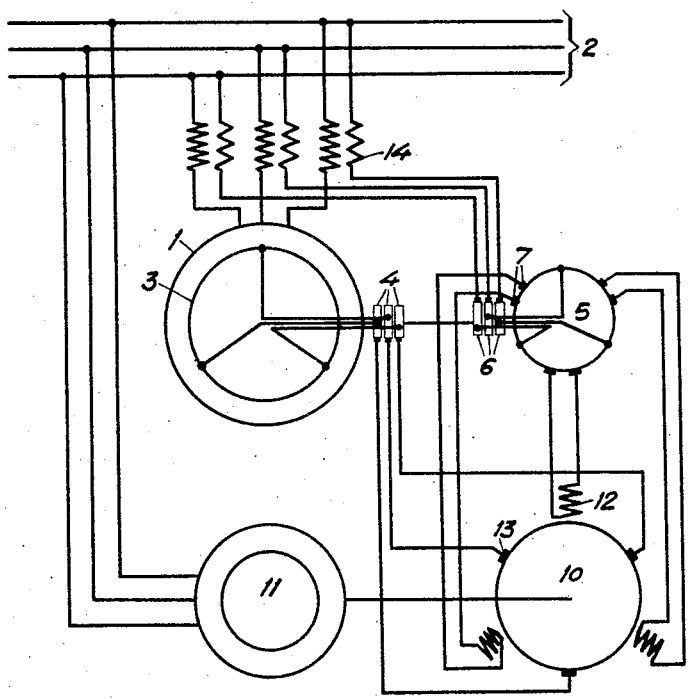

Fig. 4 shows the last-mentioned modification. In this figure the reference numbers 1—7 and 10—13 refer to the same parts as in Fig. 3. 14 is the series transformer, the primary winding of which is inserted in the leads between the line and the main machine 1 while the secondary winding is inserted in the connections between the line and the slip rings 6 of the frequency converters. The modification which this connection would undergo if applied to general arrangement according to Fig. 1 or 2 should be obvious to anyone skilled in the art.

I claim as my invention:—

1. In dynamo-electric machinery, an induction machine having primary and secondary terminals, a commutator machine having brushes connected to said secondary terminals, a power-absorbing or delivery machine mechanically connected to said commutator machine, a commutating frequency converter connected on its primary side to the primary terminals of said induction machine through an impedance and on its secondary side to an exciting winding of the first-named commutator machine, and an exciting winding on said frequency converter connected in the load circuit of said induction machine.

2. In dynamo-electric machinery, an induction machine having primary and secondary terminals, a commutator machine having brushes connected to said secondary terminals, power-absorbing or delivering means mechanically connected to said commutator machine, a commutating frequency converter connected on its primary side to the primary terminals of said induction machine through an impedance and on its secondary side to an exciting winding of the first-named commutator machine, and an exciting winding on the secondary side of said frequency converter connected in the secondary circuit of said induction machine.

In testimony whereof I have signed my name to this specification.

LUDWIG DREYFUS.